United States Patent
Rauschelbach

[11] 3,781,628
[45] *Dec. 25, 1973

[54] AUTOPILOT PITCH ATTITUDE CONTROL

[75] Inventor: Paul A. Rauschelbach, Phoenix, Ariz.

[73] Assignee: Sperry Rand Corporation, New York, N.Y.

[*] Notice: The portion of the term of this patent subsequent to Aug. 29, 1989, has been disclaimed.

[22] Filed: Mar. 29, 1972

[21] Appl. No.: 239,122

Related U.S. Application Data

[63] Continuation-in-part of Ser. No. 61,964, Aug. 7, 1970, Pat. No. 3,688,175.

[52] U.S. Cl................. 318/584, 318/611, 318/618, 244/77
[51] Int. Cl......................... B64c 13/18, G05d 1/08
[58] Field of Search..................... 318/584, 611, 618; 244/77

[56] References Cited
UNITED STATES PATENTS

| | | | |
|---|---|---|---|
| 3,688,175 | 8/1972 | Rauschelbach | 318/584 X |
| 3,682,417 | 8/1972 | Burklund et al. | 318/584 X |
| 2,878,435 | 3/1959 | Rich et al. | 318/611 X |
| 3,166,703 | 1/1965 | Mintzer | 318/618 X |
| 3,093,784 | 6/1963 | Mintzer | 318/618 X |
| 3,013,194 | 12/1961 | Cary | 318/618 |
| 2,147,674 | 2/1939 | Satterlee | 318/618 X |

Primary Examiner—T. E. Lynch
Attorney—Howard P. Terry

[57] ABSTRACT

A manually operated pitch wheel, not requiring any centering, synchronizing, or detents, is used to adjust the pitch attitude of an aircraft under control of the pitch attitude channel of an automatic flight control system. This pitch wheel may also be used to command or adjust the aircraft vertical speed in the vertical speed mode of an automatic flight control system.

10 Claims, 2 Drawing Figures

AUTOPILOT PITCH ATTITUDE CONTROL

CROSS REFERENCE TO RELATED APPLICATION

This application is a continuation-in-part of copending U.S. Pat. application Ser. No. 61,964 filed Aug. 7, 1970, Autopilot Pitch Attitude Control, by Paul A. Rauschelbach U.S. Pat. No. 3,688,175 issued Aug. 29, 1972.

BACKGROUND OF THE INVENTION

1. Field of the Invention

This invention relates to a system for introducing a manual command signal into the pitch attitude control channel of an automatic flight control system. More particularly, the invention relates to a novel manual attitude command signal source for proportionally changing the output signal level reference of an autopilot integrator for maintaining the commanded attitude.

2. Description of the Prior Art

The invention has particular application in the pitch attitude and vertical speed control mode of an automatic flight control system. Previously, the pitch attitude command wheel of the pilot's controller comprised a complex mechanization, including switching detents and centering devices requiring precision manfacture and alignment, synchronizing devices for maintaining a precise "zero reference," etc. Prior to engagement, synchronization between the pitch command wheel and the existing commanded pitch attitude was required for all trim conditions, i.e., the pitch wheel had to be centered to give a zero command for the existing trim attitude. If this condition was not satisfied, objectionable aircraft pitch attitude transients occurred at the time of autopilot engagement which transients could be severe. Additionally, if synchronization of the command pitch wheel or knob were effected prior to engagement, the pitch wheel could be too far off its normal center position to provide adequate manual pitch control in both directions.

SUMMARY OF THE INVENTION

The present invention teaches a means for manually commanding or adjusting the pitch attitude of an aircraft through the automatic flight control system while in the pitch attitude mode. In general, a manually operated pitch wheel usually mounted in the pilot's manual controller is mechanically connected to a tachometer or rate generator for providing an output signal proportional to the rate of rotary displacement of the pitch wheel. The generated signal is filtered and sensed by a level detector. At a predetermined threshold, the level detector unclamps a pitch integrator, normally clamped for pitch attitude hold mode, and thereby allows the generator signal to be integrated. The change in signal level reference of the integrator creates a pitch attitude error signal which positions the aircraft pitch control surfaces through a conventional servomechanism system. On cessation of pitch wheel motion, the generator signal reduces to zero and the pitch integrator is again clamped and will hold the adjusted signal level reference and hence the aircraft pitch attitude commanded by the pitch wheel motion.

The present invention may also be used to command a desired vertical speed. When the autopilot is in the vertical speed mode, the pitch wheel generator signal upon exceeding the threshold of the level detector, adjusts a vertical speed integrator to thereby adjust the aircraft vertical speed reference.

A primary object of the present invention is to greatly simplify the normal mechanical complexity of the manual pitch controller of an automatic pilot system.

Another object of the invention is to provide a manual pitch controller which eliminates the requirement for synchronization or mechanical recentering of the manual pitch controller or mechanical detent switches.

Another object of the invention is to prevent pitch attitude transients at engagement of the manual pitch control.

Another object of the invention is to provide a manual pitch controller that provides an output only when the pitch wheel is actually and intentionally rotated.

Another object of the invention is to provide a means for manually adjusting either the aircraft's pitch attitude or the aircraft's vertical speed, dependent upon which mode is engaged.

Another object of the invention is to provide a single, manual means for adjusting either craft pitch attitude or the vertical speed which is extremely simple in construction and hence very reliable and economically produced.

DESCRIPTION OF THE PREFERRED EMBODIMENT

Figure 1:
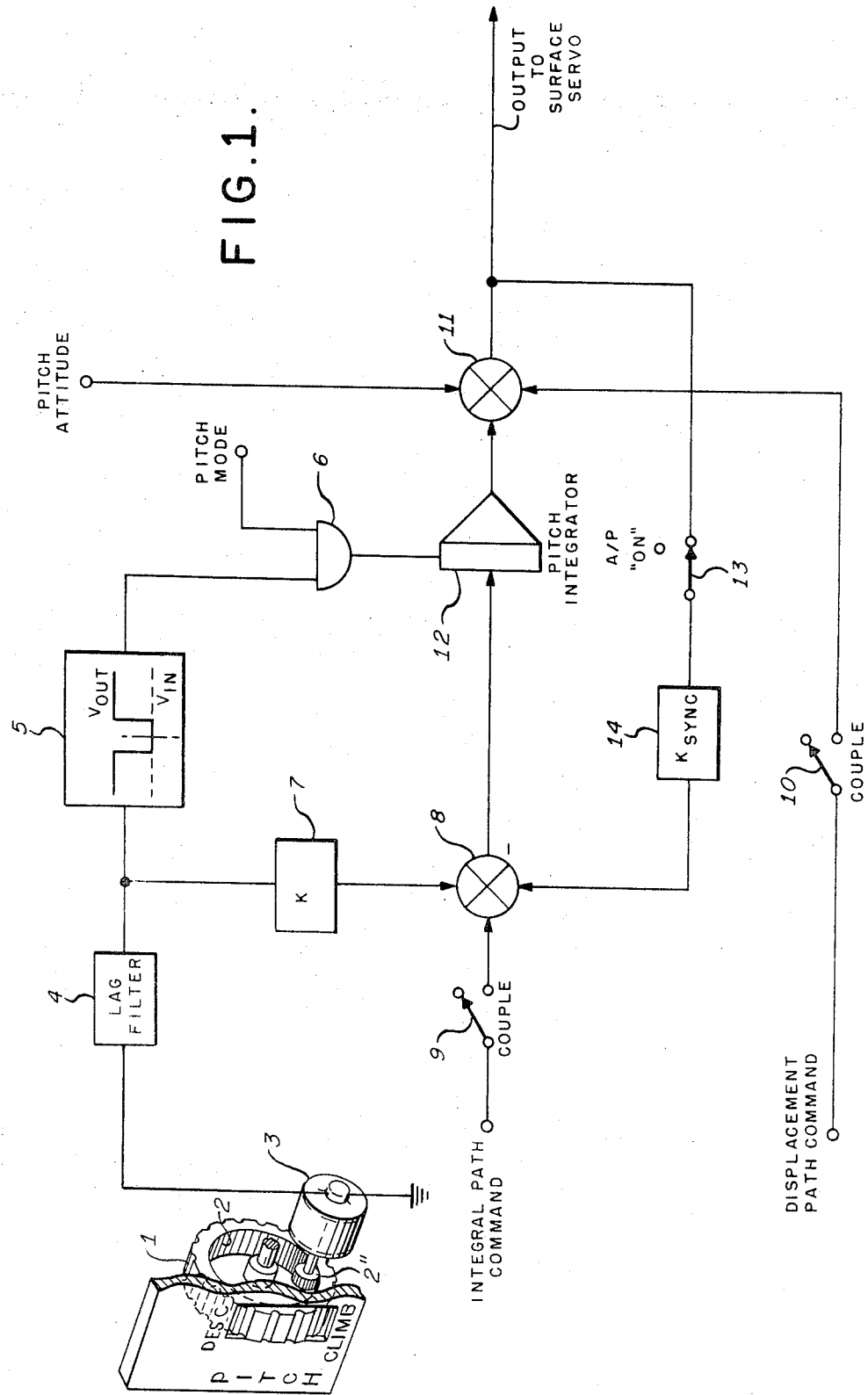
FIG. 1 illustrates a preferred embodiment of the apparatus of the present invention and incorporated in the pitch attitude hold mode of operation of an autopilot.

FIG. 1 illustrates schematically a portion of the pitch control channel of a typical automatic flight control system. A detailed description of such a system may be found in U.S. Pat. No. 3,116,899, entitled "Aircraft Automatic Pilot" and assigned to the present assignee. Briefly, the pitch channel of the automatic flight control system or automatic pilot, operates as follows. A pitch command error signal or vertical path command error signal provided, for example, by an air data system a radio glide slope receiver, a vertical speed sub system associated with said air data system, or other vertical path determining signal source, such as airspeed or mach signal sources is supplied on the lines marked "Integral Path Command" and "Displacement Path Command." In such a vertical path mode of operation of the autopilot, switches 9 and 10 are closed and the command signal appears at summing junctions 8 and 11, respectively. The displacement path command signal applied to junction 11 is the conventional direct path command. The output of summing junction 8 is integrated by integrator 12 and provides a long term error corrector signal, sometimes referred to as forward path integral control. The output of the integrator 12 appears at summing junction 11 to be added to the direct command signal. A third input to summing junction 11 is labelled "Pitch Attitude" and represents the actual pitch attitude of the aircraft, such as supplied by a vertical gyroscope. The output of summing junction 11 represents a control signal for positioning the aircraft pitch control surfaces through appropriate and conventional amplifiers and surface servomechanisms (not shown).

The integrator 12 has a feedback loop which is in effect during nonengagement of the autopilot, that is during direct manual control of the aircraft. The purpose of this feedback loop is that of keeping the integrator 12 continuously synchronized with the actual pitch attitude of the aircraft and thereby prevent undesired transients upon engagement of the autopilot. This synchronization is obtained by closing switch 13 so that the output of summing juntion 11, after being suitably gain controlled by unit 14, is fed to integrator 12, through summing junction 8. The output of the integrator 12 will increase, or decrease, at a rate controlled by its time constant determined by $K_{sync}$, until it equals the pitch attitude input to the summing junction 11. In the synchronization or disengage mode, the summing junction 11 signal output will therefore remain essentially at zero.

The basic engaged mode for the pitch channel of an automatic flight control system is usually the pitch attitude hold mode which includes means for permitting the pilot to manually adjust or modify the pitch attitude of the aircraft through the autopilot controller as he desires. The instant invention describes such a manual controller means which does not have the previously described drawbacks of existing manual systems and is schematically illustrated at the upper left in FIG. 1. The simplicity of the controller is evident and comprises a thumb wheel 1 having a large diameter internal gear 2 meshing with a small diameter gear 2'' directly driving a tachometer or rate generator 3 at a high step up speed ratio. It will be appreciated that there are no synchronizing motors, complex gear trains or cam surfaces for operating detent switches.

Prior to engagement of the autopilot, the system may have been in either a manual (pitch attitude hold) or a vertical path hold configuration. If it were in the manual configuration with the autopilot energized but not engaged, switches 9 and 10 would have been open and switch 13 closed and any attitude signal at 11 would be synchronized out as described above. On engagement of the autopilot in the attitude hold mode, switch 13 is opened and the pitch attitude reference, then existing in the integrator 12, would be maintained. If the autopilot were engaged in one of its vertical path modes, switches 9 and 10 would be closed through conventional interlock switches (not shown), and any input from a flight path command source will control the craft to the commanded vertical path then existing.

As stated, most modern autopilots generally have two basic modes. One, the path mode wherein the aircraft is controlled to fly along a pre-established path, such as altitude hold, vertical speed, glide slope, etc. The second is the manual or pitch attitude hold mode wherein the aircraft is controlled to fly at or maintain a particular pitch attitude. In the latter mode, the pitch attitude is usually manually adjustable. On engagement of the pitch attitude hold, referred to as the pitch hold mode, switches 9 and 10 would be opened through mode interlocks (not shown) and no further command signals from their signal sources would be received by integrator 12. The pitch attitude reference then present at the integrator 12 would be maintained since switch 13 would remain open. Also, in this mode the integrator will be clamped so "noise" signals will not disturb it. Thus, the autopilot will maintain the pitch attitude then existing.

Referring again to FIG. 1, the output signal of the rate generator 3 is filtered or smoothed by filter 4 to remove any ripple or other noise. A level detector 5 senses the magnitude of the filtered signal, and if it is above a predetermined threshold level, the signal will appear as one input at AND gate 6. The output of the filter 4 is simultaneously gain matched to the existing automatic flight control circuits in gain control unit 7 and the final rate signal is applied as an input to summing junction 8.

Through conventional autopilot interlock circuits which have been greatly simplified herein in the interest of brevity, selection of the pitch mode causes an interlock signal to be present at AND gate 6 and provides its second input. Actuation of gate 6 serves to unclamp integrator 12 and thereby enable it. Simultaneously, the rate signal appearing at summing junction 8 will be introduced into the integrator 12 and will be integrated to thereby provide the desired pitch attitude displacement command at its output. A signal imbalance will now exist at summing junction 11 and an error signal will be present to proportionally drive the pitch control surface through its engaged servomechanisms. The pitch control surfaces will move causing the pitch attitude of the aircraft to change. The change in pitch attitude will be reflected in a change in the vertical gyroscope signal which will appear at the summing junction 11. Depending on the response and damping characteristics of the servo system, the new or commanded pitch attitude and the altered reference level of the integrator will balance and produce a null at the output at summing junction 11 and a quiescent or steady state condition is again reached with the pitch attitude of the aircraft corresponding to that commanded by the displacement of the pitch wheel 1.

It will be recognized from the above description that the pitch wheel presents no output except while it is moved. Thus, it need not be synchronized to the autopilot during other pitch modes as was necessary with prior art manual pitch wheel systems. Also, there is no need for mechanical detents, centering springs, and the like. In other words, the signal output of the pitch wheel is not dependent upon any reference position. Its "reference" is always its last position.

Figure 2:
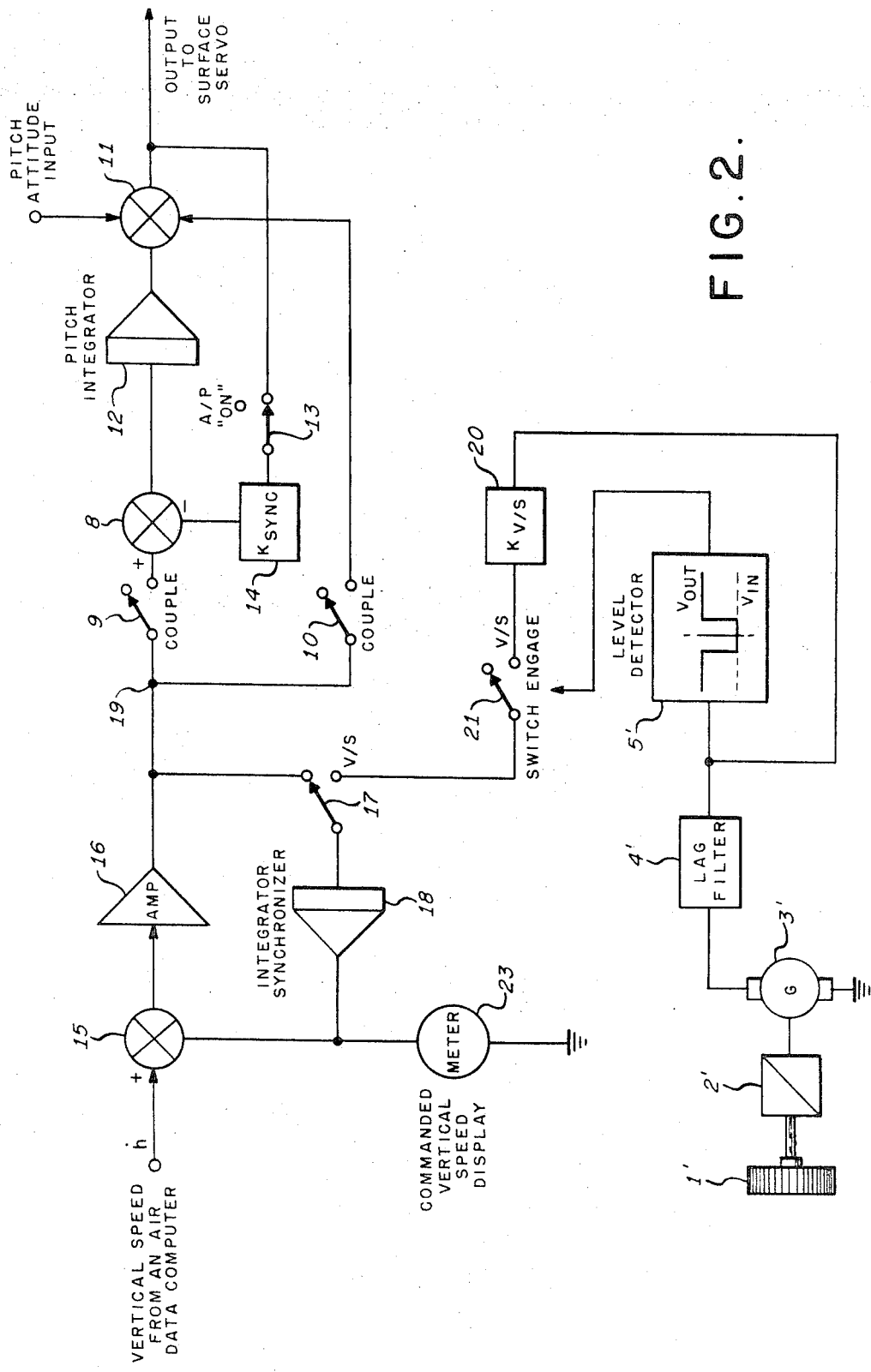
FIG. 2 illustrates a further embodiment of the apparatus of the present invention and incorporated in the vertical speed control mode of operation of the autopilot.

The invention may also be used to provide a manually commanded change in the autopilot vertical speed when in that flight path mode. FIG. 2 illustrates the previously described pitch synchronizer 12 having as its commanded input signal for both the integral and displacement paths, a signal provided from a vertical speed reference. Prior to engagement of the vertical speed mode, an electronic synchronizer loop comprising the summing junction 15, amplifier 16, switch 17, and integrator/synchronizer 18, maintains the vertical speed command at point 19 zero in a manner similar to that described above. Upon engagement of the vertical speed command mode, switch 17 is opened, again through conventional interlocks (not shown), and the integrator 18 is effectively clamped and maintains the vertical speed command signal level present at the time of engagement. Simultaneously, the switches 9 and 10 are closed, switch 13 is opened, and the vertical speed mode of the autopilot will maintain the aircraft at the pitch attitude required to maintain the vertical speed existing at the time of mode engagement. It will be noted that if desired the commanded vertical speed may be indicated to the pilot via suitable indicator 23.

Thus, the signal level at point 19 is zero and hence no signal appears at the input to integrator 12 or summing junction 11. Since the output signal level of integrator 12 matches the pitch attitude input to summing junction 11, the summing junction 11 output is zero and the surface servomechanism system is in a quiescent state resulting in the vertical speed present at the time of engagement of the vertical speed mode being maintained. By means of the present invention, the vertical speed may be conveniently manually increased or decreased as desired by the pilot's controller wheel 1 as will now be described.

A vertical speed wheel 1' driving a rate generator 3' through a step-up gear train 2' produces a signal representative of a desired change in the existing vertical speed. A filter 4' removes ripple and other noise present in the signal and a level detector 5' will inhibit any signal of less than a desired threshold level. If desired, elements 1' through 5' may be the same elements as elements 1 through 5 previously described and may be connected as shown by appropriate switching means (not shown). The output of filter 4' is matched to the system by gain control unit 20 and connected to one side of switch 21 marked V/S. An output of the level detector 5' above the threshold actuates switch 21. The output of filter 4' is now connected to the input of integrator 18 through switches 21 and 17 and integrator 18 integrates the rate signal from generator 3' to thereby provide a displacement command or vertical speed change to the vertical speed system. The output of integrator 18 is thus adjusted and an imbalance will occur at the output of summing junction 15 representing a vertical speed error signal.

The error signal present at summing point 15 is introduced to summing point 11 by switch 10 through a short term displacement path and also provides the integral path signal through integrator 12. An immediate imbalance will occur at summing point 11 causing an output and the surface servomechanism will be activated resulting in a change in aircraft pitch attitude necessary to produce the desired vertical speed. Thus, the pitch wheel 1' movement will cause change in aircraft attitude by the signal present on the displacement path and by the integral path signal from integrator 12. The pitch attitude of the aircraft will change causing a change in the pitch attitude input from the vertical gyroscope to summing junction 11 and decreasing the error signal seen by the servomechanism system. The system will stabilize at the commanded new aircraft vertical speed.

When the pitch wheel is again stationary, switch 21 will disengage and integrator 18 will remain at its new level. As the aircraft begins to assume its new pitch attitude, and hence vertical speed, the input to summing junction 15 from the air data computer will change until the summing junction output, or error signal, reduces to zero. Long term vertical speed error signals emanating from the air data computer due to fuel depletion, shift in load, etc. will cause an imbalance at summing junction 15 resulting in an error signal output. This error signal will modify the reference level in integrator 12 and cause movement of the pitch control surfaces through the servomechanism system. A change in the pitch control surfaces will cause a change in the pitch attitude of the aircraft and the vertical gyroscope will provide an input to the summing junction 11 until the system is once more stabilized.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In an automatic pilot system for aircraft, apparatus for manually controlling a flight condition of said aircraft via a control surface thereof, the combination comprising tachometer generator means, manually rotatable means coupled with said tachometer generator means for providing an output signal from said tachometer generator means proportional to the rate of rotation of said manually rotatable means and only during the manual rotation thereof, integrator means having an input and an output, means for operably connecting said tachometer generator means output signal with the input of said integrator means, means for detecting an output from said tachometer generator means in excess of a predetermined value, means responsive to said detecting means for enabling said integrator means to provide an output signal proportional to the displacement of said manually operable means, summing junction means having inputs and an output, the output of said integrator means being coupled to an input of said summing junction means, means for providing a signal representative of said flight condition to another input of said summing junction means, and surface servosystem means coupled to the output of said summing junction means for controlling said surface in accordance with said integrator means output signal to reduce the output signal from said summing junction means to zero.

2. The combination as claimed in claim 1 wherein said manually rotatable means comprises a noncentering manually operable wheel, and a step-up gear train operably connecting said wheel with said tachometer generator means.

3. The combination as claimed in claim 2 wherein said manually operable wheel comprises a relatively large diameter wheel and said step-up gear train comprises gear teeth on an internal surface of said wheel and a relatively small pinion gear on said generator means adapted to mesh with said internal gear.

4. The combination as claimed in claim 1 wherein said connecting means comprises a filter for removing ripple.

5. The combination as claimed in claim 1 wherein said detecting means comprises a threshold detector having a pre-established minimum level.

6. The combination as claimed in claim 1 wherein said integrator means comprises a clampable integrator.

7. The combination as claimed in claim 6 wherein said detecting means comprises switching means responsive to said threshold detector for operably connecting said integrator with said tachometer generator means whereby the tachometer generator output signal will adjust the integrator output signal level.

8. In an aircraft automatic flight control system having a vertical speed command mode, the combination comprising a source for the vertical speed command signal, a vertical speed integrator, pitch integrator means, a pitch attitude input signal source, summing junction means for combining the vertical speed command signal, the vertical speed integrator means output, the pitch integrator means output and the pitch attitude input signal, a servomechanism system for positioning the pitch control surfaces in response to the output signal of the summing junction means, wherein the improvement comprises manually operated tachometer generator means and means for adjusting the vertical speed integrator output signal level in accordance with the output of said tachometer generator means, whereby movement of said tachometer generator means will change the output signal level of the summing junction means and energize the servomechanism system until the output signal level change is compensated by the pitch attitude input signal.

9. The combination as claimed in claim 8 wherein said adjusting means comprises a level detector for inhibiting a signal output of said tachometer generator means of less than a predetermined value, and means for operably connecting said tachometer generator means to said vertical speed integrator when said generator means output exceeds said predetermined value.

10. The combination as claimed in claim 8 including an automatically actuatable switch responsive to an output from said level detector whereby the signal level stored within said vertical speed integrator is modified by the output of said level detector.

* * * * *